United States Patent Office 3,061,564
Patented Oct. 30, 1962

3,061,564
SHELLAC COPOLYMERS AND COMPOSITIONS AND METHODS FOR MAKING THEM
Richard E. Zdanowski and Walter W. Toy, Philadelphia, Pa., assignors to Rohm & Haas Company, Philadelphia, Pa., a corporation of Delaware
No Drawing. Filed Mar. 18, 1959, Ser. No. 800,105
17 Claims. (Cl. 260—27)

This invention relates to new copolymers and compositions comprising them as well as the methods for producing the copolymers. The invention is particularly concerned with copolymers of shellac with acrylic compounds.

It is an object of the present invention to produce copolymers of thermoplastic character which are adapted for impregnating and coating purposes and which are characterized by high adhesion toward many substrates including metals. Another object of the present invention is to provide shellac copolymers which are compatible with other materials such as waxes, artificial and natural resins including thermosetting resin-forming condensates, and thereby provide impregnating and coating compositions adapted to advantageously serve various uses. Other objects and advantages of the invention will be apparent from the description thereof hereinafter.

It has heretofore been suggested to mix shellac with various synthetic addition polymers either in solutions in organic solvents such as ethyl alcohol or in dispersions in aqueous alkaline media. The amount of shellac that can be so mixed with acrylic polymers is generally limited because of its compatibility. For example, attempts to incorporate more than 15% by weight of shellac, based on the weight of the addition polymer, into aqueous emulsion polymer dispersions generally results in the formation of hazy or cloudy coatings or films when the addition polymer is that formed of one or more esters of acrylic acid or of methacrylic acid unless special care is taken in the selection of emulsifiers.

It has now been found that shellac can be copolymerized with monomeric acrylic compounds over a wide range of proportions with the production of a variety of extremely useful products which are quite distinct in their properties from compositions formed of mixtures of shellac and the acrylic polymers. The aqueous dispersions of the graft copolymers of acrylic monomers on shellac obtained in accordance with the present invention have less tendency to foam than acrylic emulsion copolymers obtained with conventional emulsifiers. The coatings obtained have improved water-resistance; nevertheless, those obtained from copolymers containing about 15% by weight or more shellac generally retain the capacity to be removed by aqueous alkaline media, which is desirable in the formation of floor polishing materials. Furthermore, the shellac copolymers of the present invention have improved adhesion to many substrates including glass, plastics and metals, such as iron, steel, brass, and copper. In accordance with the present invention, the shellac is dissolved in an aqueous alkaline medium to which the desired monomeric acrylic compound or compounds are then added together with an addition polymerization initiator. If desired, the initiator may be used in conjunction with accelerators and promoters and optionally with an emulsifying or dispersing agent of anionic or non-ionic character. When a relatively large proportion of shellac is present in the mixture, the product obtained may be a clear colloidal dispersion of the shellac/acrylic copolymer. On the other hand, a relatively small amount of shellac generally results in the production of an aqueous dispersion similar to natural rubber latex in which the shellac/acrylic copolymer is dispersed in the form of extremely fine particles which may have diameters of less than one-tenth micron. The critical proportion of shellac in the copolymerizing mixture, above which a colloidal solution is formed and below which a latex is formed, depends upon the other monomers which may happen to be present in the system, polymerization conditions and catalyst system selection.

The acrylic monomers with which the present invention is primarily concerned are the esters and nitriles of an acid of the formula

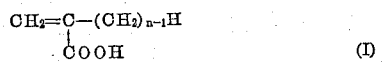

(I)

where $n$ is an integer having a value of 1 to 2. These monomers include acrylonitrile, methacrylonitrile, methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and tert-butyl methacrylate, tert-amyl methacrylate, tert-butyl or tert-amyl acrylate, cyclohexyl acrylate or methacrylate, lauryl acrylate or methacrylate, and phenoxyethyl methacrylate.

Besides the essentially non-functional monomers just recited, there may be included within the copolymer up to 10% by weight of various reactive monomers including the salts of acrylic acid, methacrylic acid, itaconic acid, maleic acid, fumaric acid, citraconic acid, aconitic acid, and the dimer of methacrylic acid with ammonia, an alkali-metal, such as sodium, potassium or lithium, or a volatile water-soluble amine such as dimethylamine or triethylamine, acrylamide, methacrylamide, and various other monomers falling within the definitions of Formulas II, III, IV, and V, as follows:

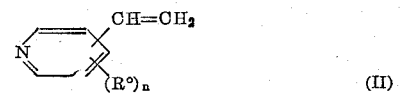

(II)

where:

R° is selected from the group consisting of H and alkyl groups having 1 to 4 carbon atoms, and
$n$ is an integer having a value of 1 to 4, $$CH_2=C(R)AYNR^1R^2$$ (III)

where:

R is selected from the group consisting of H and $CH_3$,
A is selected from the group consisting of O, S,

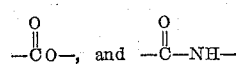

Y is an alkylene group having 2 to 4 carbon atoms,
$R^1$ is selected from the group consisting of H and an alkyl group having 1 to 4 carbon atoms, and $R^2$ is selected from the group consisting of H and an alkyl group having 1 to 4 carbon atoms,

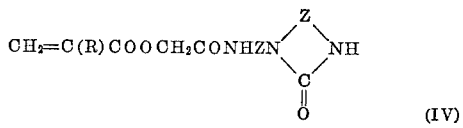

where:

R is the same as above, and

Z is an alkylene group having 2 to 3 carbon atoms.

Examples of compounds of Formula II include:

2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of Formula III include:

Dimethylaminoethyl acrylate and methacrylate
Diethylaminoethyl acrylate and methacrylate
Dimethylaminopropyl acrylate and methacrylate
Diethylaminopropyl acrylate and methacrylate
Dipropylaminoethyl acrylate and methacrylate
Di-n-butylaminoethyl acrylate and methacrylate
Di-sec-butylaminoethyl acrylate and methacrylate
Di-t-butylaminoethyl acrylate and methacrylate
Dimethylaminoethyl vinyl ether and sulfide
Diethylaminoethyl vinyl ether and sulfide
Aminoethyl vinyl ether and sulfide
Monomethylaminoethyl vinyl ether and sulfide
N,N-dimethylaminoethyl acrylamide and methacrylamide
N,N-diethylaminoethyl acrylamide and methacrylamide Examples of compounds of Formula IV include:

N-[β-(α-methacryloxyacetamido)ethyl]-N,N'-ethyleneurea
N-[β-(α-acryloxyacetamido)ethyl]-N,N'-ethyleneurea
N-[β-(α-acryloxyacetamido)ethyl]-N,N'-trimethyleneurea
N-[β-(α-methacryloxyacetamido)ethyl]-N,N'-trimethyleneurea

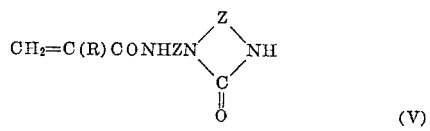

where R and Z are as defined above, of which an example is N-[β-(methacrylamido)ethyl]-N,N'-ethyleneurea.

The proportion of shellac in the mixture of shellac and acrylic compound or compounds may be from 0.5% to about 90% by weight. Preferably, the shellac constitutes at least 1% by weight of the mixture and depending upon the particular uses, the proportion may be from 10 to 60% in latex-like dispersions or above 60% up to 90% in the form of colloidal solutions.

Specific copolymers of the invention that are particularly important include the copolymers of 0.5% to 90% by weight of shellac with 10 to 99.5% by weight of acrylonitrile, methyl acrylate, ethyl acrylate, methyl methacrylate or of a mixture of methyl methacrylate with ethyl acrylate or of a mixture of acrylonitrile with ethyl acrylate. Ternary copolymer systems that are especially valuable for floor polishing compositions include copolymers of 5 to 25% by weight of shellac, 20 to 50% by weight of methyl methacrylate, and 25 to 75% by weight of ethyl acrylate. Another specific ternary system consists of the copolymers of 5 to 25% by weight of shellac, about 15% by weight of acrylonitrile, and 60 to 80% by weight of ethyl acrylate.

In preparing the copolymers, the shellac may be mixed into the water which is then made alkaline such as by the addition of ammonium hydroxide, triethylamine, morpholine, triethanolamine, or borax. Generally, about 18 to 22 parts by weight of concentrated ammonium hydroxide (28%) is needed to dissolve 100 parts by weight of shellac. The solution is generally aided by heating the aqueous ammonia to a temperature of 40° to 60° C. After the shellac is dissolved in the alkaline solution, it is generally preferred to cool the solution before adding the acrylic monomers. The cooling may lower the temperature to about 15° to 25° C. The monomers are added with stirring and then the initiator or catalyst for polymerization is added.

As polymerization catalyst there may be used one or more peroxides which are known to act as free-radical catalysts and which have solubility in aqueous solutions of the emulsifier. Highly convenient are the persulfates, including ammonium, sodium and potassium persulfates or hydrogen peroxide or the perborates or percarbonates. But there may also be used organic peroxides, either alone or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best.

In order to effect interpolymerization at a temperature below that at which coagulation might occur, it is desirable to activate the catalyst. This may best be accomplished by using a so-called redox system in which a reducing agent is present in addition to the peroxidic catalyst. Many examples of such systems are known. Agents such as hydrazine or a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehydesulfoxalate, and calcium bisulfite. Redox systems may be activated by the presence of a small amount of polyvalent metal ions. Ferrous ions are commonly and effectively thus used, a few parts per million being sufficient. The peroxidic catalyst may also be activated by the presence of a tertiary amine which is soluble in the reaction medium, such as dimethylethanolamine or triethanolamine.

The amounts of reducing agent or amine required vary somewhat with the choices of peroxide initiator, reducing activator or agents, and metal promoter, if used, also with the choice of emulsifying agent, and with the particular monomers involved. Yet within the limits of about 0.05% to 6% with reference to the weight of the mixture of monomers will be found the amount of reducing agent for practically any system. The preferred amounts of sulfite agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact after most of the monomers have interpolymerized, the resulting dispersion can be heated to boiling without breaking the dispersion. During interpolymerization the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

In the process of polymerization here described an aqueous emulsion of a mixture of the defined polymerizable monomers is stirred and treated with a redox system starting between about 10° C. and about 40° C. About 0.01% to 1% of a peroxidic catalyst based on the weight of the monomers used is usually an effective amount at the start and the required amount of reducing substance, hydrosulfite, sulfite, metabisulfite, or the equivalent for this system, may be of the same order or somewhat more by weight. When interpolymerization starts, the temperature of the mixture rises, usually rather rapidly. Care is taken to keep the temperature of the mixture below the levels at which coagulation might occur.

Amounts of monomers are supplied to bring the content of dispersed interpolymer to 25% to 60% of the total dispersion, preferably to 45% to 55%. Interpolymerization or copolymerization should be carried on until no more than a few percent of monomers remain in the mixture. When these monomers are volatile, they can be reduced or removed by steam distillation or stripping under reduced pressure, if so desired.

With the attainment of desired interpolymer content in good yield, with or without removal of residual monomers, the dispersion is cooled, cooling to a range of 50° to 20° C. being generally satisfactory.

It is generally unnecessary to add a dispersing agent to the system. It appears that a small portion of the shellac tends to serve to disperse the monomers and also the copolymer obtained. However, if desired, a non-ionic or anionic surface-active agent or a mixture thereof may be introduced into the system to aid in the emulsification of the monomers or the stabilization or dispersion of the polymer system obtained. Typical non-ionic emulsifiers which may be used include alkylphenoxypolyethoxyethanols having alkyl groups of about seven to twelve carbon atoms, such as heptylphenoxypolyethoxyethanols, octylphenoxypolyethoxythenols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc. Suitable anionic dispersing agents include the sodium salts of the higher fatty acid sulfates, such as that of lauryl alcohol, the higher fatty acid salts, such as the oleates or stearates of morpholine, triethanolamine or mixed ethanolamines.

After the completion of the polymerization, the copolymer may be separated from the aqueous medium, such as by spray-drying or, when it is in the form of a latex, by coagulation which may be effected by the addition of salts or other electrolytes. The resulting polymer may be washed and dried if desired. It then can be used for melting-coating or the so-called extrusion-coating systems or it may be dissolved in organic solvents for coating and impregnating applications. Examples of organic solvents include volatile alcohols such as ethyl alcohol, n-butanol, isobutanol, isopropanol, amyl alcohol, acetone, methyl ethyl ketone, dioxane, propylene glycol, diethylene glycol methyl ether, ethyl acetate, butyl acetate, mixtures of the solvents just mentioned with each other or with hydrocarbon solvents such as solvent naphthas, xylenes, toluene, or benzene.

For most impregnating and coating purposes, it is preferable to employ the aqueous dispersion or colloidal solution of the shellac copolymer that is obtained by copolymerization directly. However, if desired, residual monomer may be removed before application of the aqueous dispersion. Whereas organic solvent solutions obtained with the solvents above are normally used at concentrations from 1 to 20% because higher concentrations have excessive viscosities, the aqueous dispersions may be employed even at concentrations as high as 60 or 70% by weight of copolymer solids. However, the aqueous dispersions may be diluted to concentrations as low as 1% for application. For most purposes, concentrations of 10 to 40% in the aqueous dispersions are used, but in coating metals, the concentration may be as high as 45%.

The copolymer dispersions, or the solutions of the copolymer in the organic solvents named, may be applied for coating or impregnating various substrates to produce a clear impregnant or coating within or on the substrate. The film-forming temperature of the shellac copolymer depends upon the particular monomer or monomers with which it is copolymerized as well as the proportions between them. Thus, a copolymer containing a large proportion of methyl methacrylate would have a relatively high film-forming temperature and it would be necessary to heat the coatings of such a copolymer obtained from the aqueous dispersions thereof to an elevated temperature sufficient to form the copolymer into a continuous film. At temperatures below the copolymer's minimum film-forming temperature, the drying of the coating results in the deposition of the copolymer as a fine powder. On the other hand, a copolymer of shellac with a large amount of ethyl acrylate, butyl acrylate, or methyl acrylate has a minimum film-forming temperature below room temperature so that merely air-drying the coatings thereof serves to form a continuous film. In either event, whether heating is required or not to form a film or coating from the copolymer, a clear glossy coating or impregnation is obtained.

The dispersions or solutions of the present invention may be pigmented or fillers or delustrants may be introduced for special purposes. Examples of suitable pigments which may be included in an amount up to 100% by weight of the copolymer blend include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth. The proportion of such pigment or filler may be from about one-fiftieth of the weight of the copolymer to as much as 20 times the weight of copolymer depending upon the particular application desired. Such pigmented systems are adapted to form water-base paints when the copolymers therein have minimum film-forming temperatures which are near or below room temperature or when plasticizers are introduced to lower the film-forming temperature of the copolymer to room temperature or below. The pigmented systems may also be applied for printing and pigment-dyeing of textiles and the mineral coating of paper. The pigmented systems are also useful for the priming of metals or for the application of finished coats over primed metal surfaces.

Generally, the aqueous dispersions which are employed for coating or impregnating purposes may have a pH of about 7.5 to 11. When mixed with emulsions or aqueous dispersions of waxes or alkali-soluble resins to make floor finishes, it is generally desirable to adjust the pH of the polymer dispersions to at least 8.5 and the pH may be as high as 9.5 to 11 or more. Suitable alkaline or buffering agents such as borax, ammonia, or amines (including the simple water-soluble amines such as diethylamine, triethylamine, morpholine, and triethanolamine) may be introduced to adjust the pH to the desired value.

The aqueous dispersions may contain up to about 40% of a plasticizer whenever it is necessary in a particular application, to provide a lower temperature of film formation from the emulsion polymer dispersions. From 5 to 20% by weight of the plasticizer, based on the weight of copolymer, is quite practical.

When the purpose of the plasticizer is to facilitate film formation and the copolymer is inherently tough and flexible, a fugitive or semi-fugitive plasticizer is preferred rather than a permanent plasticizer. Certain plasticizers, such as tributoxyethyl phosphate, serve also as leveling agents.

Examples of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethylhexyl benzyl phthalate, dicyclohexyl phthalate, diallyl phthalate, dibenzyl phthalate, butyl cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, di(methylcyclohexyl)phthalate, tributoxyethyl phosphate, and tributyl phosphate. The particular plasticizer and the amount thereof used are chosen in accordance with the demand for compatibility and efficiency in lowering the film-forming temperature.

The clear or pigmented copolymer dispersions or solutions may be applied to numerous other substrates including leather, wood, glass, masonry, such as brick, concrete block, cement, asbestos cement shingles and siding, ceramics, wall-covering and floor-covering materials, such as linoleum, vinyl tile, and felt-base materials. They are particularly characterized by outstanding adhesion to most of the aforementioned materials, and can be employed to form thermoplastic coatings thereon in which event baking although beneficial is not required.

Various substances can be incorporated into the aqueous copolymer dispersions of the present invention to provide a greater variety of properties than are obtainable from the copolymer itself. A particularly advantageous use of the copolymers is in the production of floor polishing compositions wherein they are desirably compounded with a wax and an alkali-soluble resin. The wax may either be natural or artificial including such waxes as polyethylene, carnauba wax, montan wax, Japan wax, beeswax, paraffin wax and candelilla wax.

Examples of alkali-soluble resins include shellac, Manila gum, Loba gum, and alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids, such as abietic or rosin. The resins disclosed in United States Patent 2,063,542 may be used. These resins have acid numbers of about 100 to 145. Examples of the dicarboxylic acids include maleic, fumaric, adipic, sebacic, as well as anhydrides thereof. The polyhydric alcohols may be glycerol, pentaerythritol, trimethylolethane, and glycols having 2 to 8 carbon atoms including diethylene glycol and triethylene glycol. In such compositions the amount of dispersing or emulsifying agent or agents may be from 3 to 8% of the combined weights of blended copolymer and wax. The concentration of the aqueous dispersion for application purposes may desirably be from 8 to 25% solids and is preferably from about 10 to 15% by weight of solids.

In floor polishing compositions the proportions of the main ingredients should be:

| Constituent: | Proportion |
| --- | --- |
| (A) Copolymer | 20–90 parts by weight. |
| (B) Wax | 5–60 parts by weight. |
| (C) Alkali-soluble resin | 5–40 parts by weight. |
| (D) Wetting, emulsifying and dispersing agents | 0.5% to 8% of A+B+C. |
| (E) Water | To make total solids of 8% to 25%. |

For a non-buffable self-polishing composition, the wax should be not over 35 parts by weight, preferably 5 to 25 parts by weight in the formulation of the above table. For a buffable composition the wax should be at least 35 parts by weight. Examples of wetting and dispersing agents include alkali metal and amine salts of higher fatty acids having 12 to 18 carbon atoms, such as sodium, potassium, ammonium, or morpholine oleate or ricinoleate, as well as the common non-ionic surface-active agents. Additional wetting agent improves the spreading action of the polish.

The copolymer, wax, and resin may be mixed in any order desired. For example, the wax or resin or both may be introduced into the aqueous polymer dispersion by adding a dispersion of the wax or resin or both to the copolymer dispersion or vice versa. Preferably, the copolymer is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate, are quite useful. Besides incorporating wax in floor polishing compositions, an additional plasticizer or a fugitive fluxing aid may be used to reach the desired minimum film-forming temperature of the composition.

The shellac copolymers are compatible with various thermosetting resin-forming precondensates including the condensates of formaldehyde with phenol, urea, thiourea, N,N'-ethyleneurea, aminotriazines such as melamine, benzoguanamine, and acetoguanamine, as well as the alkylated formaldehyde condensates with the various compounds just named in which the alkylation is effected with methanol or in some cases ethanol. A small amount of an amine salt, such as triethylamine maleate, may be added for the purpose of developing an acid on heating which serves to catalyze the insolubilization of the condensate during baking. The compositions containing the thermosetting resin-forming condensates may be applied to any of the various substrates mentioned hereinabove, but they are particularly useful when the copolymer also contains the reactive groups mentioned above for forming hard finishes of thermosetting character on metal surfaces, particularly on such household appliances as refrigerators, stoves, and the like. The application of such mixed shellac-copolymer/thermosetting condensate compositions is followed by drying and a curing or baking at a temperature of 212° to 450° F. The time of curing may vary from a period ranging from one-half to three minutes at the upper temperature or higher, whereas the baking may be effected for about one-half hour at the lower temperature of the range just mentioned.

The shellac copolymers may be applied for the impregnation of non-woven webs, bibulous papers, or saturation papers for unifying or binding fibers therein to form backings for pressure-sensitive adhesive tapes or other types of adhesive tapes. They may be employed as coatings on dense papers and cardboards to impart grease-resistance and water-proofing without preventing transmission of water-vapor. The coatings on leather have similar water-proofing but vapor-transmissive characteristics so that garment leathers prepared therefrom provide protection of the wearer with comfort.

The shellac copolymer dispersions and solutions may be applied to textiles for the purpose of binding fibers in non-woven fabrics or for the stabilization of wool against shrinkage on washing. For such purposes, the acrylic monomers with which the shellac is copolymerized are ordinarily selected from those which impart softness and flexibility such as butyl acrylate, methyl acrylate, or ethyl acrylate.

In the following examples, which are illustrative of the invention, the parts and percentages are by weight unless otherwise indicated.

*Example 1*

(a) Eighteen parts by weight of ground bleached shellac was introduced with stirring into 637 parts by weight of water to which 3.2 parts by weight of 28% $NH_4OH$ solution was added. The mixture was heated to 60° C. for a period of 50 minutes to dissolve the shellac and the resulting solution was cooled to 25° C. Then 205 parts by weight of ethyl acrylate and 137 parts by weight of methyl methacrylate were added and stirred to thoroughly mix the monomers into the shellac solution. While agitation was continued, 0.68 part of ammonium persulfate and 0.68 part of sodium hydrosulfite were added to effect polymerization, which was completed in about 20 minutes resulting in a stable dispersion with a solids content of about 36%.

(b) Two hundred and sixteen parts by weight of ethyl acrylate and 144 parts by weight of methyl methacrylate were emulsified in 640 parts by weight of water by means of 18 parts by weight of a tert-octylphenol modified with an average of 40 ethylene oxide units ($OPE_{40}$). Copolymerization was effected in the presence of 0.72 part by weight of ammonium persulfate and 0.72 part by weight of sodium hydrosulfite to produce a copolymer dispersion.

(c) Part (b) was repeated but 10.8 parts by weight of sodium lauryl sulfate (NaLS) was employed as the emulsifier in place of the 18 parts by weight of $OPE_{40}$.

(d) Emulsion preparations from parts (a), (b), and (c) above were evaluated in terms of the following tests:

*Film hardness.*—Knoop Indentation test based on ASTM test method D 1474–57T.

*Minimum film formation temperature (MFT).*—Determination of minimum temperature at which coalescence of polymer particles occurs to give continuous films.

*Foam.*—300 grams of emulsion diluted to 10% solids were placed in a 1-liter beaker and whipped with a high-speed mixer for a period of 15 seconds. Foam height was measured in inches after the whipped emulsion was allowed to stand for periods of 5 and 10 minutes respectively.

*Mechanical stability.*—100 grams of emulsion diluted to 30% solids was stirred in a Waring Blendor for a period of 4 minutes. The dispersion was passed through fine cheesecloth and the percent coagulation determined.

*Settling studies.*—Dispersions were diluted to 1% solids and allowed to stand at 25° C. for a period of one month.

*Adhesion.*—Qualitative observations of adhesion to glass, cold rolled steel and such oleo-resinous substrates as linoleum were made on 2–3 mils (dry thickness) films of the emulsions by scraping the dried films with a knife.

(e) The following results were obtained on the three emulsions prepared in accordance with (a), (b), and (c) above:

| Dispersant | 5% Shellac (a) | 5% $OPE_{40}$ (b) | 3% NaLS (c) |
|---|---|---|---|
| MFT—°C | 12 | 14 | <0. |
| Film Hardness—KHN | 2.3 | 0.63 | 1.48. |
| Foam Height—After 5′ | 0.0 | 3.8 | 9.6. |
| Foam Height—After 10′ | 0.0 | 3.4 | 8.7. |
| Mechanical Stability—Percent Coagulation | 7.1 | 50.0 | 14.4. |
| Settling Test | 0.00 | 0.00 | 0.00. |
| Adhesion to: | | | |
| glass | Excellent | Poor | Poor. |
| steel | do | do | Do. |
| linoleum | Good | do | Do. |

The low foaming characteristics with excellent stability under high shearing stresses and outstanding adhesion properties of the shellac acrylate system are well borne out by these data.

*Example 2*

(a) Seventy-two parts by weight of ground bleached shellac was introduced with stirring into 725 parts by weight of water to which 14.8 parts by weight of 28% $NH_4OH$ was added. The mixture was heated to 60° C. for a period of fifty minutes and the resulting solution was cooled to 25° C. Two hundred and eighty-eight parts by weight of methyl methacrylate was added and stirred to thoroughly mix the monomer into the shellac solution. While keeping the mixture under continued agitation, 0.58 part by weight of ammonium persulfate and 0.58 part by weight of sodium bisulfite were added to effect polymerization. The resultant composition was a fine-particle size emulsion lightly tan in color.

(b) Twenty parts by weight of carnauba wax was melted and then introduced into 120 parts by weight of water at 95° C. which also contained 4 parts by weight of oleic acid and 2.5 parts by weight of morpholine.

(c) Ten parts by weight of ammonia-soluble rosin-maleic type adduct partially esterified with a polyhydric alcohol sold by the Rohm & Haas Company under the trademark Amberol 750 was added to 68.7 parts by weight of water containing 1.4 parts by weight of 28% $NH_4OH$ solution and maintained at 50° C. The resulting solution was filtered and diluted to 12% solids.

(d) Ten parts by weight of oleic acid was added to 87 parts by weight of water containing 3.1 parts by weight of morpholine.

(e) Eighty parts of the dispersion of part (a) hereof was diluted to 12.5% solids and 2.0 parts by weight of dibutyl phthalate was added. To this emulsion were added the following ingredients to produce a floor polish composition:

20 parts by weight of the carnauba wax emulsion of part (b) hereof,
10 parts by weight of the solution of part (c) hereof,
1 part by weight of morpholine oleate solution of part (d) hereof.

The resulting coating composition was quite stable on storing. When applied to linoleum, vinyl and asphalt floor tile surfaces, it leveled well and dried rapidly to give tough surfaces characterized by excellent initial gloss and final gloss after submission to foot-traffic conditions. The coating was found to show no water-spotting when exposed to water for one hour after a 4-hour drying at 25° C. Yet, it could be removed very easily with a dilute (3%) $NH_4OH$ solution.

*Example 3*

(a) The procedure of Example 1(a) was repeated except for the substitution of the following materials in the amounts given, no methyl methacrylate being used:

| | Parts |
|---|---|
| Shellac | 36 |
| Ethyl acrylate | 324 |
| Water | 633 |
| 28% NH$_4$OH | 7.4 |
| Ammonium persulfate | 0.64 |
| Sodium bisulfite | 0.64 |

(b) The resulting dispersion was submitted to the tests listed in 1(d) and similar observations of outstanding adhesion, stability, and low foaming tendency were made. Coatings on leather showed excellent adhesion and resistance to water.

(c) Acrylonitrile (250 parts) was substituted for the ethyl acrylate of part (a) hereof. Coatings on asbestos cement shingles showed excellent adhesion, gloss, and resistance to water.

*Example 4*

(a) Example 1(a) was repeated, using:

| | Parts |
|---|---|
| Shellac | 324 |
| 28% NH$_4$OH | 64.8 |
| Ethyl acrylate | 36 |
| Water | 575.2 |
| Ammonium persulfate | 0.07 |
| Sodium bisulfite | 0.07 |

The resulting composition was a light brown solution with a moderate viscosity.

(b) The solution of part (a) was formulated into a floor polish composition in the same fashion as described in Example 2(e) except that the dibutyl phthalate was omitted. The final coating composition was applied to linoleum, vinyl and asphalt floor tile surfaces. It leveled well and dried rapidly, giving a tough coating characterized by excellent initial gloss and excellent gloss retention after exposure to foot-traffic. The coating showed no water-spotting when exposed to water for one hour after a 4-hour drying at 25° C. Yet, it could be removed very easily with a dilute (3%) NH$_4$OH solution.

(c) Similar results are obtained in a floor polish formulated as in part (b) but using a copolymer obtained as in part (a) hereof with methyl acrylate substituted for ethyl acrylate.

*Example 5*

(a) Thirty-six parts by weight of ground bleached shellac was introduced with stirring into 633 parts by weight of water to which 7.4 parts by weight of 28% NH$_4$OH was added. The mixture was heated to 60° C. for a period of 50 minutes to dissolve the shellac and the resulting solution was cooled to 25° C. Three and five-tenths parts by weight of sodium lauryl sulfate was introduced into the solution followed by an addition of 324 parts by weight of methyl methacrylate. The mixture was stirred to thoroughly mix the monomer into the shellac solution. Sixty-four hundredths parts by weight of ammonium persulfate and 0.64 part of sodium bisulfate were added to effect polymerization. The resultant fine-particle size dispersion was diluted to 12.5% solids.

(b) Example 1(a) was repeated, using:

| | Parts |
|---|---|
| Shellac | 108 |
| 28% NH$_4$OH | 21.6 |
| Water | 619.0 |
| Ethyl acrylate | 252 |
| Ammonium persulfate | 0.50 |
| Sodium bisulfite | 0.50 |

The resultant fine-particle size dispersion was diluted to 12.5% solids.

(c) Forty parts by weight of emulsifiable low molecular weight polyethylene (melting at about 75° C.) containing eight parts by weight of oleic acid were melted and 8 parts by weight of morpholine were added to the mixture. The completed melt was added slowly to 184 parts by weight of water heated to 205° F. while under vigorous agitation. The emulsion was allowed to cool and was then diluted to 12.5% solids.

(d) A coating composition was made up using the following blend:

64 parts by weight of the methyl methacrylate/shellac copolymer composition of part (a), 16 parts by weight of the ethyl acrylate/shellac copolymer composition of part (b), 20 parts by weight of the polyethylene dispersion of part (c), 10 parts by weight of the polyester resin solution of Example 2(c).

The resultant coating formulation was applied to a clean terazzo floor. It was found to level out well and impart a very high gloss to the substrate. The coating showed excellent adhesion to the substrate even under prolonged wet traffic conditions. It displayed outstanding gloss initially and after several weeks of exposure to normal wear.

*Example 6*

(a) The procedure of Example 1(a) was repeated, using:

| | Parts |
|---|---|
| Shellac | 108 |
| Triethylamine | 27 |
| Water | 613 |
| Ethyl acrylate | 180 |
| Methyl methacrylate | 72 |
| Ammonium persulfate | 0.50 |
| Sodium bisulfite | 0.50 |

(b) There were mixed and ground on a roller mill 266.2 parts of titanium dioxide, 76.0 parts of lithopone, 51.5 parts of mica, 80.7 parts of silicate, 6.8 parts of the formaldehyde-condensed sodium naphthalene sulfonate, 7.2 parts of diethylene glycol, and 189.5 parts of water. When this mixture had been ground to a smooth, uniform paste, it was mixed thoroughly with 600 parts of the aqueous dispersion of part (a) hereof. The resulting product was a flat white aqueous base paint which was applied to masonry or brick surfaces with excellent covering power and good flow and leveling characteristics. When applied to cold-rolled steel, it was found to produce a coating with outstandingly tenacious adhesion.

*Example 7*

(a) Example 1(a) was repeated, using:

| | Parts |
|---|---|
| Shellac | 54 |
| Borax | 34 |
| Water | 640 |
| Methyl methacrylate | 198 |
| Butyl acrylate | 108 |
| Ammonium persulfate | 0.62 |
| Sodium bisulfite | 0.62 |

(b) The dispersion of part (a) was diluted to 20% total solids and was then applied to oak flooring. It imparted to the substrate a high degree of gloss which was retained even after prolonged periods of exposure to foot-traffic conditions.

*Example 8*

(a) Example 1(a) was repeated, using:

| | Parts |
|---|---|
| Shellac | 72 |
| Triethanolamine | 18 |
| Water | 622 |
| Ethyl acrylate | 187 |
| Methyl methacrylate | 101 |
| Ammonium persulfate | 0.58 |
| Sodium bisulfite | 0.58 |

(b) Eighty parts by weight of the dispersion obtained in part (a) was diluted to 12.5% solids and mixed with 20 parts by weight of carnauba wax emulsion of Example 2(b) and 10 parts by weight of the Amberol solution of Example 2(c). The resulting coating composition was applied to new automobile tires to protect them from abrasion and dust during storage and while in transit. The coating was then removed with a mild alkali (3% NH₄OH) as a soap solution.

*Example 9*

The dispersion of Example 6(a) was applied to cold-rolled steel by spraying. Following a 10-minute drying period at room temperature, the sample was placed in an oven and was baked for 30 minutes at 350° F. The film was characterized by high gloss, excellent uniformity and excellent adhesion initially as well as after an overnight submersion in water at 25° C.

*Example 10*

Example 1(a) was repeated, using:

| | Parts |
|---|---|
| Shellac | 36 |
| 28% NH₄OH | 7.2 |
| Water | 653 |
| Methyl methacrylate | 288 |
| Ethyl acrylate | 36 |
| Ammonium persulfate | 0.64 |
| Sodium bisulfite | 0.64 |

After diluting the resulting dispersion to 15% solids, it was coated on green-colored asbestos-cement shingles at a rate of 6 pounds (total dry copolymer) per 1000 square feet of the shingles. The coated shingles were then dried in a heated air tunnel in which the temperature was about 140° F. A hard, wear-resistant coating was obtained which prevents the efflorescence which causes whitening of such shingles in irregular splotches. They were resistant to blocking and dirt pick-up and exhibited excellent abrasion resistance. It displayed unusually low degree of foaming during application.

*Example 11*

The procedure of Example 1(a) was repeated, but with the following materials:

| | Parts |
|---|---|
| Shellac | 90 |
| 28% NH₄OH | 18 |
| Water | 542 |
| Methyl methacrylate | 72 |
| Ethyl acrylate | 198 |
| Ammonium persulfate | 0.54 |
| Sodium hydrosulfite | 0.54 |

The aqueous dispersion thus obtained was diluted to 20% solids with water, and then applied as a topcoat to the surface of a piece of leather carrying a base coat of poly(ethyl acrylate). After drying at 150° F. for four hours, the finished leather was flexible, glossy, and had excellent resistance to water and acetone.

*Example 12*

The procedure of Example 1(a) was repeated, but with the following materials:

| | Parts |
|---|---|
| Shellac | 90 |
| 28% NH₄OH | 18 |
| Water | 542 |
| Acrylonitrile | 54 |
| Ethyl acrylate | 216 |
| Ammonium persulfate | 0.675 |
| Sodium hydrosulfite | 0.675 |

The aqueous dispersion thus obtained was used as in Example 11 with similar results.

It is to be understood that changes and variations may be made without departing from the spirit and scope of the invention as defined by the appended claims.

We claim:

1. A copolymer of 0.5 to 90% by weight of shellac and 10 to 99.5% by weight of at least one monomer selected from the group consisting of acrylonitrile, methacrylonitrile, and esters of an alcohol selected from the group consisting of cyclohexanol and alkanols having 1 to 18 carbon atoms with an acid of the formula

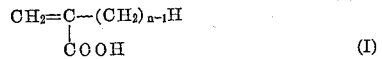

$$CH_2=C-(CH_2)_{n-1}H$$
$$\phantom{CH_2=}|$$
$$\phantom{CH_2=}COOH \qquad (I)$$

wherein $n$ is an integer having a value of 1 to 2, the copolymer being obtained by polymerizing the monomer molecules dispersed in an aqueous alkaline solution of shellac containing a free-radical polymerization initiator.

2. A copolymer of 0.5 to 90% by weight of shellac and 10 to 99.5% by weight of acrylonitrile obtained by polymerizing the acrylonitrile dispersed in an aqueous alkaline solution of shellac containing a free-radial polymerization initiator.

3. A copolymer of 0.5 to 90% by weight of shellac and 10 to 99.5% by weight of ethyl acrylate obtained by polymerizing the ethyl acrylate dispersed in an aqueous solution of shellac containing a free-radical polymerization initiator.

4. A copolymer of 0.5 to 90% by weight of shellac and 10 to 99.5% by weight of methyl acrylate obtained by polymerizing the methyl acrylate dispersed in an aqueous alkaline solution of shellac containing a free-radical polymerization initiator.

5. A copolymer of 0.5 to 90% by weight of shellac and 10 to 99.5% by weight of methyl methacrylate obtained by polymerizing the methyl methacrylate dispersed in an aqueous alkaline solution of shellac containing a free-radical polymerization initiator.

6. A copolymer of 0.5 to 90% by weight of shellac and 10 to 99.5% by weight of methyl methacrylate and ethyl acrylate obtained by polymerizing the acrylates dispersed in an aqueous alkaline solution of shellac containing a free-radical polymerization initiator.

7. A copolymer of 0.5 to 90% by weight of shellac and 10 to 99.5% by weight of acrylonitrile and ethyl acrylate obtained by polymerizing the nitrile and acrylate dispersed in an aqueous alkaline solution of shellac containing a free-radical polymerization initiator.

8. A copolymer of 5 to 25% by weight of shellac, 20 to 50% by weight of methyl methacrylate and 25 to 75% by weight of ethyl acrylate obtained by polymerizing the acrylates dispersed in an aqueous alkaline solution of shellac containing a free radical polymerization initiator.

9. A copolymer of 5 to 25% by weight of shellac, about 15% by weigth of acrylonitrile, and 60 to 80% by weight of ethyl acrylate obtained by polymerizing the nitrile and acrylate dispersed in an aqueous alkaline solution of shellac containing a free-radical polymerization initiator.

10. An aqueous dispersion of a copolymer of 0.5 to 90% by weight of shellac and 10 to 99.5% by weight of at least one monomer selected from the group consisting of acrylonitrile, methacrylonitrile, and esters of an alkanol having 1 to 18 carbon atoms with an acid of the formula

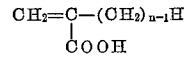

$$CH_2=C-(CH_2)_{n-1}H$$
$$\phantom{CH_2=}|$$
$$\phantom{CH_2=}COOH$$

wherein $n$ is an integer having a value of 1 to 2, the copolymer being obtained by polymerizing the monomer molecules dispersed in an aqueous alkaline solution of shellac containing a free-radical polymerization initiator.

11. An aqueous dispersion of a copolymer of 5 to 25% by weight of shellac, 20 to 50% by weight of methyl methacrylate, and 25 to 75% by weight of ethyl acrylate obtained by polymerizing the acrylates dispersed in an aqueous alkaline solution of shellac containing a free-radical polymerization initiator.

12. An aqueous dispersion of a copolymer of 5 to 25% by weight of shellac, about 15% by weight of acrylonitrile, and 60 to 80% by weight of ethyl acrylate obtained by polymerizing the nitrile and acrylate dispersed in an aqueous alkaline solution of shellac containing a free-radical polymerization initiator.

13. A coating composition comprising an alkaline aqueous dispersion of (a) a copolymer of 0.5 to 90% by weight of shellac and 10 to 99.5% by weight of at least one monomer selected from the group consisting of acrylonitrile, methacrylonitrile, and esters of an alcohol selected form the group consisting of cyclohexanol and alkanols having 1 to 18 carbon atoms with an acid of the formula $$CH_2=C-(CH_2)_{n-1}H$$
$$|$$
$$COOH$$

where $n$ is an integer having a value of 1 to 2, the copolymer being obtained by polymerizing the monomer molecules dispersed in an aqueous alkaline solution of shellac containing a free-radical polymerization initiator, and (b) a wax, the ratio of the copolymer to wax being from 3:1 to 6:1.

14. A coating composition comprising an alkaline aqueous dispersion comprising water and 8 to 25% by weight of a mixture of (a) 20 to 90 parts by weight of a copolymer of 0.5 to 90% by weight of shellac and 10 to 99.5% by weight of at least one monomer selected from the group consisting of acrylonitrile, methacrylonitrile, and esters of an alcohol selected from the group consisting of cyclohexanol and alkanols having 1 to 18 carbon atoms with an acid of the formula $$CH_2=C-(CH_2)_{n-1}H$$
$$|$$
$$COOH$$

where $n$ is an integer having a value of 1 to 2, the copolymer being obtained by polymerizing the monomer molecules dispersed in an aqueous alkaline solution of shellac containing a free-radical polymerization initiator, (b) 5 to 40 parts by weight of an alkali-soluble resin, and (c) 5 to 60 parts by weight of a wax.

15. A coating composition as defined in claim 14 comprising 0.5 to 8% by weight, based on the total weight of (a), (b), and (c), of surfactant.

16. An article of manufacture comprising a solid substrate carrying a dried deposit of a coating composition comprising a copolymer of 0.5 to 90% by weight of shellac and 10 to 99.5% by weight of at least one monomer selected from the group consisting of acrylonitrile, methacrylonitrile, and esters of an alcohol selected from the group consisting of cyclohexanol and alkanols having 1 to 18 carbon atoms with an acid of the formula $$CH_2=C-(CH_2)_{n-1}H$$
$$|$$
$$COOH$$

where $n$ is an integer having a value of 1 to 2, the copolymer being obtained by polymerizing the monomer molecules dispersed in an aqueous alkaline solution of shellac containing a free-radical polymerization initiator.

17. A method which comprises copolymerizing shellac with at least one monomer selected from the group consisting of acrylonitrile, methacrylonitrile, and esters of an alcohol selected from the group consisting of cyclohexanol and alkanols having 1 to 18 carbon atoms with an acid of the formula $$CH_2=C-(CH_2)_{n-1}H$$
$$|$$
$$COOH$$

where $n$ is an integer having a value of 1 to 2, by mixing the monomeric material and a free-radical polymerization initiator into an aqueous alkaline solution of shellac containing at least 0.5% of shellac, the relative proportion of shellac and monomeric material being from 0.5 to 90% by weight of the former and from 10 to 99.5% by weight of the latter.

References Cited in the file of this patent

UNITED STATES PATENTS

| | | |
|---|---|---|
| 1,997,572 | Bren | Apr. 16, 1935 |
| 2,340,699 | Sarbach | Feb. 1, 1944 |
| 2,760,542 | Peterson et al. | Aug. 28, 1956 |
| 2,765,286 | Goldberg et al. | Oct. 2, 1956 |